US011028319B2

(12) United States Patent
Widger et al.

(10) Patent No.: US 11,028,319 B2
(45) Date of Patent: Jun. 8, 2021

(54) PASSIVE THERMALLY DRIVEN VARIABLE OPACITY MATERIALS

(71) Applicant: E Ink Corporation, Billerica, MA (US)

(72) Inventors: Peter Carsten Bailey Widger, Nashua, NH (US); Jay William Anseth, Canton, MA (US); Richard J. Paolini, Jr., Framingham, MA (US); Craig Alan Breen, Arlington, MA (US); Wesley Viola, Burlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/222,424

(22) Filed: Dec. 17, 2018

(65) Prior Publication Data

US 2019/0185742 A1     Jun. 20, 2019

Related U.S. Application Data

(60) Provisional application No. 62/607,964, filed on Dec. 20, 2017.

(51) Int. Cl.
    *C09K 9/02*        (2006.01)
    *G02F 1/01*         (2006.01)

(52) U.S. Cl.
    CPC .............. *C09K 9/02* (2013.01); *G02F 1/0147* (2013.01)

(58) Field of Classification Search
    CPC ................................ C09K 9/02; G02F 1/0147
    See application file for complete search history.

(56) References Cited

U.S. PATENT DOCUMENTS

| | | | |
|---|---|---|---|
| 5,587,404 A | 12/1996 | Kroner et al. | |
| 5,615,040 A | 3/1997 | Watanabe | |
| 7,339,715 B2 | 3/2008 | Webber et al. | |
| 9,701,829 B2 | 7/2017 | Jhaveri et al. | |
| 2011/0020215 A1 | 1/2011 | Ryu et al. | |
| 2015/0329715 A1 | 11/2015 | Zilles et al. | |
| 2018/0004018 A1 | 1/2018 | Oron et al. | |

OTHER PUBLICATIONS

L. Liu, H. Sheardown, Glucose permeable poly (dimethyl siloxane) poly (N-isopropyl acrylamide) interpenetrating networks as ophthalmic biomaterials, Biomaterials 26 (2005) 233-244. (Year: 2005).*

(Continued)

*Primary Examiner* — Bijan Ahvazi
(74) *Attorney, Agent, or Firm* — Brian D. Bean

(57) ABSTRACT

A variable opacity material is provided that may be in the form of a mixture, such as an emulsion that contains a discontinuous aqueous polymeric solution having an LCST of 0 to 100° C. and a continuous phase containing a hydrophobic polymer, such as a polysiloxane. One or more salts, such as lithium bromide and sodium chloride, may be added to the aqueous solution to lower the LCST of the aqueous solution and to raise the refractive index of the aqueous polymeric solution to substantially match the refractive index of the hydrophobic polymer. The variable opacity materials may be applied in the form of a film to various substrates, such as glass.

17 Claims, 3 Drawing Sheets

(56) References Cited

OTHER PUBLICATIONS

Yong Ren, Kai Seng Koh and Yaping Zhang, Synthesis of Functional Materials by Non-Newtonian Microfluidic Multiphase System Advances in Microfluidics—New Applications in Biology, Energy, and Materials Sciences, Chapter 16, Nov. 23, 2016, pp. 259-383, (Year: 2016).*

Liang-Yin Chu, Andrew S. Utada, Rhutesh K. Shah, Jin-Woong Kim, and David A. Weitz,, Controllable Monodisperse Multiple Emulsions, Angew. Chem. Int. Ed. 2007, 46, 8970-8974 (Year: 2007).*

C. Zamecnik, M. J. Loureiro, C. Postnikoff, Y. Kong, and A. Penlidis, Synthesis and Morphology of poly(N-isopropylacrylamide) Nanocomposites with Emulsion Templated Nanoporous Structure, Journal of Macromolecular Science, Part A: Pure and Applied Chemistry (2012) 49, 906-909 (Year: 2012).*

Korean Intellectual Property Office, PCT/US2018/066115, International Search Report and Written Opinion, dated Apr. 10, 2019. Apr. 10, 2019.

Ma, Dan et al., "Preparation and characterization of thermoresponsive PDMS surfaces grafted with poly(N-isopropylacrylamide) by benzophenone-initiated photopolymerization.", Journal of Collois and Interface Science, vol. 332, Issue 1, pp. 85-90, (Apr. 1, 2009). Apr. 1, 2009.

Poschlad, K. et al., "Thermodynamics of aqueous solutions containing poly (N-isopropylacrylamide)", The Journal of Chemical Thermodynamics, vol. 43, Issue 3, pp. 262-269, (Mar. 2011). Mar. 1, 2011.

Kuo, A.C.M., "Poly(dimethylsiloxane)", Polymer Data Handbook, Oxford University Press, Inc., pp. 411-435 (1999). Jan. 1, 1999.

Kim, Young-Jin et al., "Thermo-responsive polymers and their application as smart biomaterials", Journal of Materials Chemistry B, vol. 5, Issue 23, pp. 4307-4321 (Feb. 20, 2017). Feb. 20, 2017.

Chiba, Ryotarou et al., "Electrooptical Behavior of Liquid-Crystalline (Hydroxypropyl)cellulose/Inorganic Salt Aqueous Solutions", Macromolecules, vol. 36, Issue 5, pp. 1706-1712 (Feb. 8, 2003). Feb. 8, 2003.

* cited by examiner

PASSIVE THERMALLY DRIVEN VARIABLE OPACITY MATERIALS

CROSS-REFERENCE TO RELATED APPLICATION

This application claims the benefit of Provisional Application Ser. No. 62/607,964, filed on Dec. 20, 2017, the content of which is incorporated herein by reference in its entirety.

FIELD OF THE INVENTION

This invention relates to aqueous compositions that can transition from clear to opaque in response to a temperature change and laminatable films comprising the aqueous compositions.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or in the case of displays intended for machine reading, pseudo-color in the sense of a change in reflectance of electromagnetic wavelengths outside the visible range.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

One type of electro-optic material that may be used as a light modulator is a variable opacity film. Variable opacity films may be passively switched from clear to opaque states in response to temperature changes. Currently available variable opacity films may include phase-separating polymer solutions (water soluble polymers that phase separate at higher temperature, such as those disclosed in U.S. Pat. No. 5,615,040), phase-separating thermotropic gels (hydrogels having a lower critical solution temperature ("LCST"), such as those disclosed in U.S. Pat. No. 5,587,404), and thermotropic polymers (polymer particles imbedded in a different polymer matrix, such as those disclosed in U.S. Patent Application Publication 2015/0329715).

The aqueous systems within the above-listed categories suffer from several disadvantages. For example uncrosslinked phase separating polymers can settle over time in their insoluble form leading to undesirable variations in opaqueness in a film. Crosslinked gels also suffer from a lack of uniformity in the opaque state. Certain phase-separating polymer solutions cannot be optically coupled and emulsified easily into an external phase, such as a binder, for coating purposes due to the fluids' low refractive index. Furthermore, when the uncrosslinked fluids are coated between glass substrates, additional sealants are needed to seal in moisture resulting in increased manufacturing costs. Phase-separating thermotropic gels are typically expensive to manufacture and difficult to apply due to their high viscosity. Also, the low crosslinking density in hydrogels does not provide a robust material. Another disadvantage for some of these materials is the large change in volume with increased temperature, which may cause sealing failures.

Thus, there is a need for improved variable opacity films.

SUMMARY

In one aspect of the present invention, a variable opacity material comprises a mixture of an aqueous polymeric solution having an LCST from 0 to 100° C. and a hydrophobic polymer, wherein below the LCST, the difference between refractive indices of the aqueous solution and the hydrophobic polymer is less than 0.05.

These and other aspects of the present invention will be apparent in view of the following description.

BRIEF DESCRIPTION OF THE FIGURES

The drawing Figures depict one or more implementations in accord with the present concepts, by way of example only, not by way of limitations.

DETAILED DESCRIPTION

Figure 1:
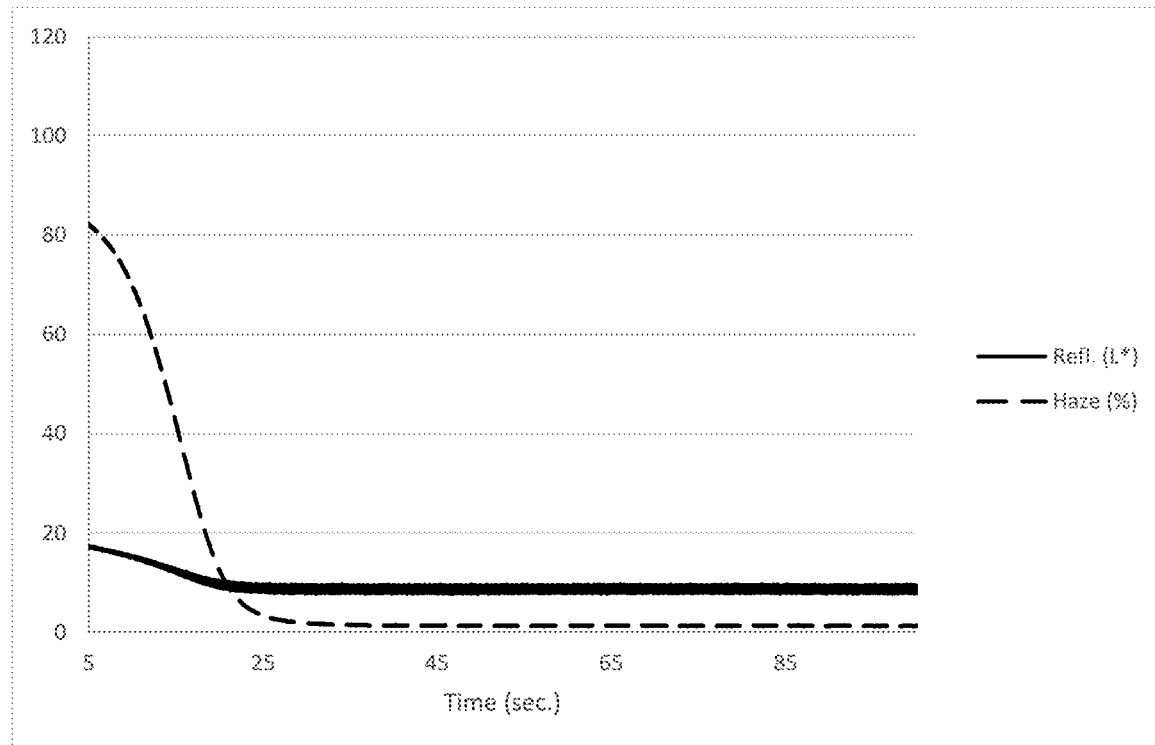
FIG. 1 is a graph plotting reflectivity and haze over time for an aqueous solution of hydroxypropyl cellulose and lithium bromide that was cooled from approximately 45° C. to room temperature.

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide variable opacity materials that may be provided in the form of robust, laminatable films. Flexible, passive thermally switchable, variable opacity films according to various embodiments of the present invention may comprise a mixture, such as an emulsion made by emulsifying aqueous polymeric solutions with an LCST into an index matched curable hydrophobic polymer, such as silicone. In order to match the refractive index of the aqueous polymeric solution to the hydrophobic polymer, high refractive index salts may be added to the aqueous polymeric solution. Potential applications for the variable opacity materials include, but are not limited to, glare reduction for windows, reflective films to prevent overheating from sunlight, temperature regulating green houses or roofing tiles, and aesthetically pleasing accents for architectural elements such as shower doors. The variably opacity films may be applied to existing glass infrastructure. A relatively high concentration of salts in the discontinuous phase of the variable opacity films may prevent microbial growth, as well as provide a composition with a depressed freezing point. The curable hydrophobic polymer may provide a more robust variable opacity film and slows the diffusion of water from the film, as well as providing a relatively soft film that, while crosslinked, is able to stretch and expand allowing for volume changes with temperature.

As noted above, the aqueous discontinuous phase of the emulsions made according to the various embodiments of the present invention comprise one or more polymers. The solutions may have an LCST from 0 to 100° C. Exemplary polymers that may be incorporated in the aqueous solutions include, but are not limited to poly(N-isopropylacrylamide) and polymers derived from cellulose, such as hydroxypropylcellulose that preferably have an average molecular weight of about 1000 to 100,000. In a preferred embodiment, the one or more polymers in the aqueous polymeric solution may be present, with increasing preference in the order given, not more than 40, 35, 30, 25, 20, 15, and 10 wt. % based on the weight of the aqueous solution, and with increasing preference in the order give, not less than 9, 8, 7, 6, 5, 4, 3, 2, and 1 wt. % based on the weight of the aqueous solution.

As noted above, the refractive index of the aqueous polymeric solution is preferably matched to the refractive index of the hydrophobic polymer in the mixtures according to the various embodiments of the present invention. In a preferred embodiment, the difference between refractive indices of the aqueous polymeric solution and the hydrophobic polymer may be, with increasing preference in the order given, not more than 0.05, 0.03, 0.01, 0.008, 0.006, 0.004, 0.002, and 0.001.

In order to substantially match the refractive index of the aqueous polymeric solution with the hydrophobic polymers of the mixtures according to various embodiments of the present invention may include one or more high refractive index salts. In a preferred embodiment, the refractive index of each of the one or more salts is, with increasing preference in the order give, not less than 2.0, 1.9, 1.8, 1.7, 1.6, 1.5, and 1.4. Preferred high refractive index salts used in various embodiments of the present invention include, but are not limited to, alkali metal halides (e.g. lithium bromide and lithium iodine) and salts of alkaline earth metals, preferably halides of alkaline earth metals (e.g. magnesium bromide). Lithium iodide is a less preferred salt for the aqueous solution because oxidation may cause the solution to turn brown or yellow. The addition of a reducing agent, such as ascorbic acid, in aqueous solutions containing lithium iodide may prevent the color change. In a preferred embodiment, the salts having a high refractive index may be present, with increasing preference in the order given, not more than 70, 60, 50, 45, and 40 wt. % based on the weight of the aqueous discontinuous phase and with increasing preference in the order given, not less than 35, 30, 25, and 20 wt. % based on the weight of the aqueous discontinuous phase.

In addition to the one or more salts having a high refractive index, the aqueous phase of the emulsions according to the various embodiments of the present invention may further comprise one or more salts added in an amount effective to lower the LCST of the aqueous solution depending on the desired application for the variable opacity material. The LCST-reducing salt may or may not be the same as the high refractive index salt. In a preferred embodiment, the LCST of the aqueous polymeric solution comprising the one or more salts is, with increasing preference in the order given, not more than 80, 75, 70, 65, 60, 55, 50, 45, 40, 35, 30, 25, and 20° C.

Appropriate salts that may be incorporated in the aqueous polymeric solutions of the various embodiments of the present invention may be selected from salts known to salt out polymers. As known by those of skill in the art, the Hofmeister series provides a list of salts ranked from most likely to less likely to salt out a polymer. If a single salt is unable to satisfactorily increase the refractive index of the aqueous solution and simultaneously lower the LCST, a combination of salts may be selected on opposite ends of the Hofmeister series. For example, in some embodiments of the present invention, lithium bromide and magnesium bromide may be effective at increasing the refractive index of the aqueous polymeric solution without substantially changing the LCST. Therefore, a second salt intended to lower the LCST may be added. For example, the second salt may be selected from the group consisting of potassium acetate, sodium sulfate), and sodium chloride). In a preferred embodiment, the second salt may be present, with increasing preference in the order given, not more than 50, 40, 30, 20, and 10 wt. % based on the weight of the aqueous solution, and with increasing preference in the order given, not less than 9, 8, 7, 6, 5, 4, 3, 2, 1, and 0.5 wt. % based on the weight of the aqueous polymeric solution.

The one or more hydrophobic polymers included in the mixtures according to the various embodiments of the present invention preferably have a refractive index that is substantially similar to the aqueous polymeric solution, such that the mixture is generally transparent at a temperature below the LCST. In preferred embodiments, the hydrophobic polymers and the aqueous solutions each independently have a refractive index from 1.3 to 1.5. The one or more hydrophobic polymers are also preferably water-resistant to prevent evaporation of the aqueous polymeric solutions from the mixture. The one or more hydrophobic polymers are preferably curable, such as photo-curable or thermally curable polysiloxanes. Upon cross-linking, the continuous phase may provide structural support, such that the mixture may be incorporated in rugged materials that can be coated as thin or thick films that will not settle in their opaque state. When the mixture is provided in the form of an emulsion, the external continuous phase comprising the hydrophobic polymer gives the benefits of slowing water loss from the switchable internal discontinuous phase comprising the aqueous polymeric solution, and crosslinking gives structural support to allow for rugged materials that can be coated as thin or thick films that will not settle in their opaque state. In a preferred embodiment, the one or more hydrophobic polymers may be present, with increasing preference in the order given, not more than 75, 70, 65, 60, and 55 wt. % based on the weight of the emulsion and with increasing preference in the order given, not less than 50, 45, 40, 35, 30, and 25 wt. % based on the weight of the emulsion.

The passive thermally switchable, variable opacity films according to the various embodiments of the present invention may be printed on a wide variety of flexible and rigid substrates. The substrates may also be provided in the form of a dark backing material, so that the substrate exhibits a change in reflectivity with temperature. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Because the films can be printed (using a variety of methods), the resulting printed substrates may be made inexpensively.

EXAMPLES

The following examples are given as illustrative embodiments of the present invention and are not intended to limit the scope of the invention.

Example 1

An aqueous solution was prepared by combining hydroxypropyl cellulose (HPC) and lithium bromide, such that the resulting solution contained 8.2% HPC and 36.6% LiBr. The resulting clear solution had a refractive index of approximately 1.4 as measured by an Abbe refractometer at approximately 25° C. The solution was placed between two glass plates with a 5 mil shim and heated gently with a heat gun to approximately 45° C., until the solution became opaque. Upon cooling the solution from a temperature of approximately 45 C to room temperature, the solution returned to its original transparent state. During cooling, the sample was placed in front of a calibrated light source with an integrating detector on the opposite side of the sample to calculate the percent of reflected light, i.e. reflectivity. Additionally, a calibrated chopping wheel was used to measure the diffuse versus the transmitted light to evaluate haze. The reflectivity (L*) and haze (%) was measured and plotted with time as illustrated in FIG. 1. As used herein throughout the specification and the claims, "haze" refers to the percentage of diffuse transmitted light (light that is scattered as it is transmitted), compared to total transmitted light.

Example 2

Four samples of aqueous solutions (Samples A to D) were prepared by combining hydroxypropyl cellulose (HPC), lithium bromide, and sodium chloride. The minimum and maximum temperature at which a change in opacity was observed. The temperature ranges, representing the approximate LCST for the four samples, and their respective concentrations of HPC and salts are provided in Table 1. The addition of sodium chloride reduced the LCST while still providing clear solutions.

TABLE 1

| | Sample | | | |
|---|---|---|---|---|
| | A | B | C | D |
| % LiBr | 36.174 | 33.674 | 29.767 | 27.435 |
| % HPC | 3.704 | 3.448 | 3.048 | 2.809 |
| % NaCl | 2.915 | 4.171 | 5.689 | 6.885 |
| Tmin (C.) | 32.6 | 30.1 | 26.5 | 24.5 |
| Tmax (C.) | 34.1 | 32.5 | 28.0 | 26.7 |

Example 3

Figure 2A:
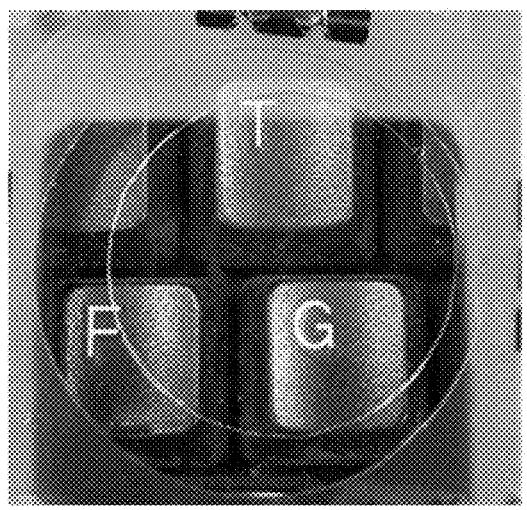
FIG. 2A is a photograph of an emulsion at room temperature according to a first embodiment of the present invention applied between two glass substrates.
Figure 2B:
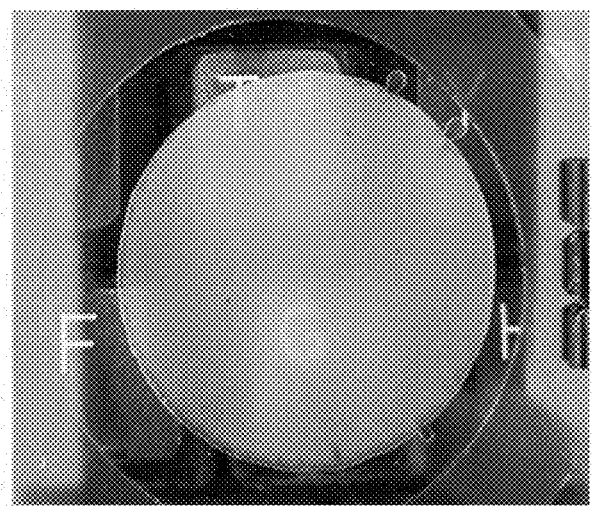
FIG. 2B is a photograph of the emulsion of FIG. 2A at an elevated temperature.

An emulsified sample was prepared by first providing an aqueous solution containing 14 wt % hydroxypropyl cellulose, 26.4 wt % lithium bromide, and 3 wt % sodium chloride. 2 mL of the aqueous solution was emulsified into 3 mL of silicone consisting of Sylgard® 184 with 0.25 wt % TEGOFlow 354 at a 9:1 base to curing agent ratio. A 5 mil thick film of the emulsion was applied between two glass slides. As demonstrated in FIG. 2A, the emulsion at room temperature was clear at room temperature. The same sample turned opaque when heated above 45° C. as demonstrated in FIG. 2B.

Example 4

Four samples of aqueous solutions (Samples E to H) were prepared containing hydroxypropyl cellulose, lithium bromide, and sodium chloride. Each sample was heated above its LCST. The reflectivity of each sample was measured according to the procedure described in Example 1. The concentrations and reflectivities of the samples are provided in Table 2. By increasing the concentration of HPC, the reflectivities were increased; however, the viscosity also increased with increasing HPC concentration. Heating the solutions lowered the viscosity. Therefore, it is suggested that emulsions prepared for applications requiring high reflectivity, such as reflecting sunlight for energy saving, should use heated aqueous solutions, so that emulsions may be more easily prepared when emulsifying the aqueous solutions into a polysiloxane.

TABLE 2

| | Sample | | | |
|---|---|---|---|---|
| | E | F | G | H |
| % LiBr | 33.4 | 0 | 0 | 0 |
| % HPC | 8 | 13.4 | 16.5 | 20 |
| % NaCl | 3.8 | 0 | 0 | 0 |
| Refl. (L*) | 20 | 35 | 40 | 42 |

Example 5

An aqueous internal phase was prepared by combining the following materials: 20 wt % aqueous hydroxypropyl cellulose (2.961 g, Aldrich 435007 Average Mn~10,000 Mw~80,000), lithium bromide (5.299 g), 5 wt % aqueous sodium chloride (5.005 g), and DI water (0.637 g). The materials were mixed giving a clear colorless solution. The final concentrations of HPC, LiBr, and NaCl were 4.26%, 38.12%, and 1.8% respectively. The silicone external phase was prepared by mixing thoroughly 13.5 g Sylgard® 184 base with 0.0375 g TEGO-flow 354 and 1.5 g Sylgard® 184 crosslinking fluid. Silicone and the polymer solution were emulsified by repeatedly passing the materials between two joined syringes until a homogeneous mixture was obtained (about 60 cycles). To confirm that a water in oil emulsion was formed, a small amount of sample was gently stirred in water and observed to resist dissolution. The resulting emulsion was allowed to cure at room temperature between two sheets of glass separated by a 5 mil shim for 48 hours.

Figure 3:
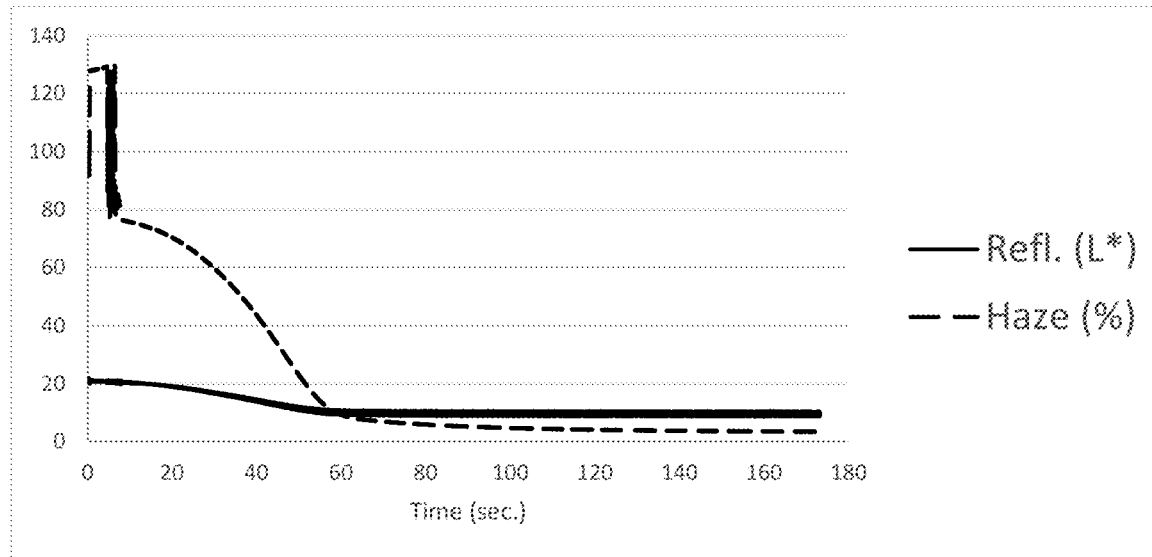
FIG. 3 is a graph plotting reflectivity and haze versus time for a heated film cooled to room temperature described in Example 1.

The film was heated above the solution's transition temperature using a heat gun and optical properties, reflectivity and haze, were measured according to the procedure described in Example 1. The measured properties are illustrated in FIG. 3. The unheated film exhibited a haze of about 3.5%. The transition temperature of the polymer solution was measured to be approximately 35° C. Over about 60 seconds as the film cooled, haze values dropped from about 80% to 8% while reflectivity values decreased from 21% to 11%. Full clarity was reached at about 160 seconds.

Example 6

Figure 4:
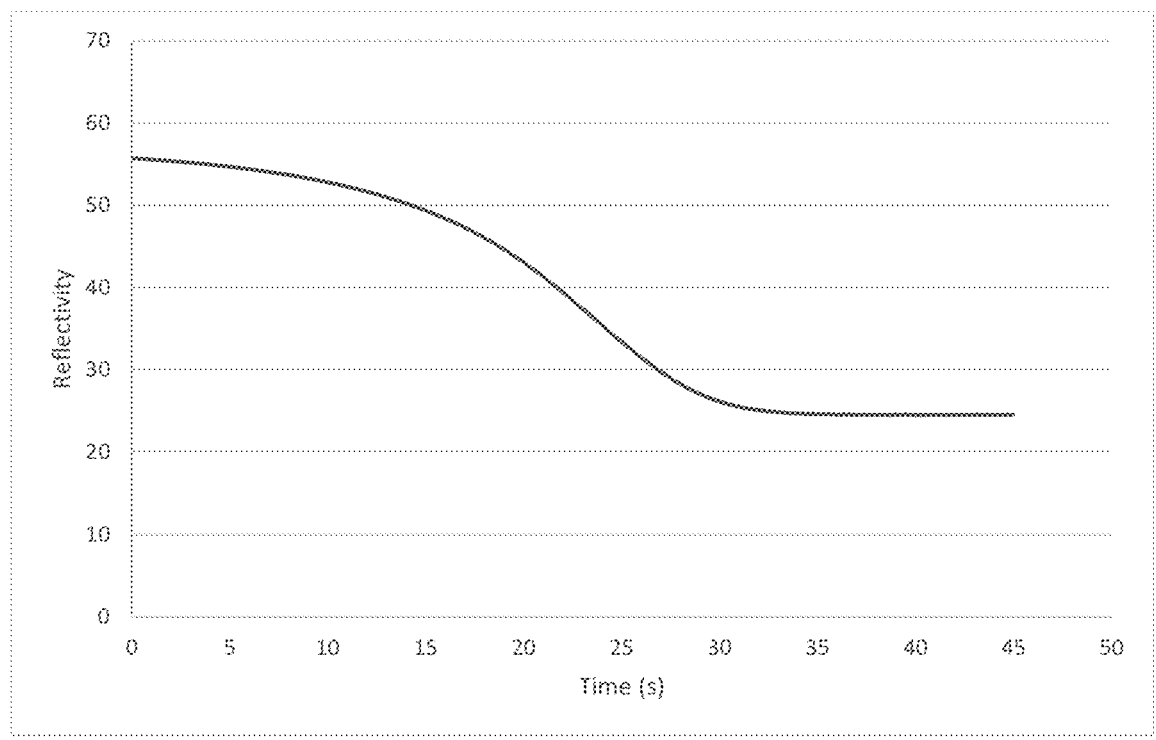
FIG. 4 is a graph plotting the haze over time for a heated film cooled to room temperature described in Example 6.
Figure 5:
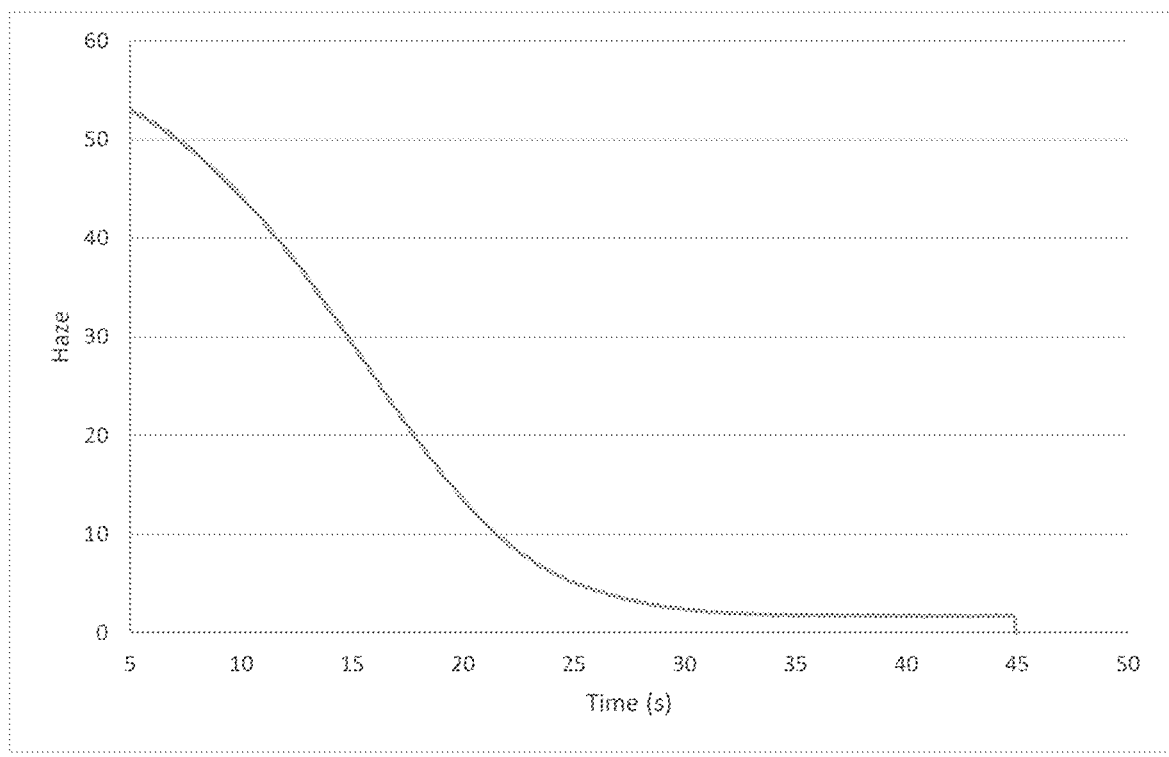
FIG. 5 is a graph plotting the reflectivity over time for a heated film cooled to room temperature described in Example 6.

An aqueous solution was prepared by combining 5.02 g HPC (average Mw~80,000, average Mn~10,000, Aldrich 435007) and 9.34 g MgBr2 hexahydrate (Aldrich 216844) and 10.74 g DI water in a vial and rolling overnight. Sample reflectivity and haze were measured according to the procedure described in Example 1 by applying a film of the solution between glass slides with a 5 mil shim, heating the solution above 60 C with a heat gun, and allowing the sample to cool to room temperature (see FIG. 4 and FIG. 5). The solutions refractive index was 1.4216 at approximately 25° C. and became opaque at approximately 48° C.

Example 7

Seven samples of aqueous solutions (Samples M to S) were prepared by combining hydroxypropyl cellulose (HPC), magnesium bromide, and (optionally) sodium chloride. The refractive index at 25° C. measured by Abbe refractometer, LCST, and their respective concentrations of HPC and salts are provided in Table 3. The addition of sodium chloride reduced the LCST while still providing clear solutions.

TABLE 3

| Sample | M | N | O | P | R | S | T |
|---|---|---|---|---|---|---|---|
| HPC wt % | 20 | 15 | 10 | 5 | 10 | 10 | 10 |
| MgBr2 wt % | 27.7 | 37.7 | 46.7 | 56.2 | 46.4 | 46.1 | 45.4 |
| NaCl wt % | 0 | 0 | 0 | 0 | 0.5 | 1 | 2 |
| RI | 1.4102 | 1.4216 | 1.425 | 1.4328 | 1.4269 | 1.426 | 1.4249 |
| LCST (C.) | 42 | 48 | 52 | 56 | 52 | 50 | 48 |

From the results of Example 6 and 7, it was observed that aqueous solutions of $MgBr_2$ and HPC can be index matched to silicones (RI~1.41-1.43) and demonstrate an elevated switching temperature compared to aqueous solutions of LiBr and HPC. Because lithium bromide is psychoactive and toxic, variable opacity materials utilizing lithium bromide may be excluded from certain applications, such as indicators for bottles or glassware to indicate when a beverage is too hot to safely drink. Therefore, because emulsions containing HPC/$MgBr_2$ solutions are less toxic and exhibit LCSTs above 40° C., these emulsions may be preferred for food-contact containers and packaging.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

We claim:

1. A variable opacity material comprising an emulsion of an aqueous polymeric solution and a hydrophobic polymer, wherein:
    the aqueous polymeric solution comprises hydroxypropyl cellulose or poly(N-isopropylacrylamide) and from 10 to 60 wt. % of an alkaline earth metal salt, wherein the hydroxypropyl cellulose or poly(N-isopropylacrylamide) phase separates at temperatures above the lower critical solution temperature (LCST),
    the aqueous polymeric solution has an LCST from 0 to 100° C.,
    the aqueous polymeric solution is emulsified in the hydrophobic polymer,
    the aqueous polymeric solution is a discontinuous phase of the emulsion and the hydrophobic polymer is a continuous phase of the emulsion, and
    below the LCST, the difference between refractive indices of the aqueous polymeric solution and the hydrophobic polymer is less than or equal to 0.05.

2. The variable opacity material of claim 1, wherein the hydrophobic polymer comprises a polysiloxane.

3. The variable opacity material of claim 2, wherein the polysiloxane comprises polydimethyl siloxane.

4. The variable opacity material of claim 1, wherein the aqueous polymeric solution comprises a second salt.

5. The variable opacity material of claim 4, wherein the aqueous polymeric solution comprises less than or equal to 5 wt. % of the second salt.

6. The variable opacity material of claim 4, wherein the second salt is sodium chloride.

7. The variable opacity material of claim 1, wherein the at least one salt is magnesium bromide.

8. The variable opacity material of claim 1, wherein the aqueous polymeric solution comprises hydroxypropyl cellulose.

9. The variable opacity material of claim 1, wherein the aqueous polymeric solution has an LCST greater than or equal to 25° C. and less than or equal to 35° C.

10. The variable opacity material of claim 1, wherein the aqueous polymeric solution has a refractive index greater than or equal to 1.4.

11. The variable opacity material of claim 1, wherein the aqueous polymeric solution comprises from 1 to 40 wt. % of a polymer.

12. The variable opacity material of claim 1, wherein the hydrophobic polymer is curable.

13. The variable opacity material of claim 12, wherein the hydrophobic polymer is thermally curable.

14. The variable opacity material of claim 1, wherein the hydrophobic polymer is crosslinked.

15. The variable opacity material of claim 1, wherein the continuous phase is crosslinked.

16. A variable opacity film comprising the variable opacity material of claim 1 coated between two substrates.

17. The variable opacity film of claim 16, wherein at least one of the substrates is transparent.

* * * * *